United States Patent [19]

Adkins

[11] Patent Number: 4,930,934
[45] Date of Patent: Jun. 5, 1990

[54] SURFACE, SUBSURFACE, CONTINUOUS FEED MOISTURE MAINTENANCE SYSTEM APPARATUS AND METHOD

[76] Inventor: Donald E. Adkins, P.O. Box 217, San Simon, Ariz. 85632

[21] Appl. No.: 193,266

[22] Filed: May 11, 1988

[51] Int. Cl.⁵ .............................. E02B 11/00
[52] U.S. Cl. ........................ 405/37; 405/39; 405/45; 137/599; 138/45; 239/542; 239/569
[58] Field of Search ............ 405/37, 38, 39, 43, 405/45, 36; 137/78.3, 599; 138/45; 239/390, 396, 542, 569, 63

[56] References Cited

U.S. PATENT DOCUMENTS

| | | | |
|---|---|---|---|
| 2,130,498 | 9/1938 | Klemschofski | 61/10 |
| 2,743,552 | 5/1962 | Hunter | 47/1 |
| 3,426,539 | 2/1969 | Whear | 61/13 |
| 3,440,822 | 4/1969 | Hegler | 61/10 |
| 3,779,468 | 12/1973 | Spencer | 239/542 |
| 3,817,454 | 6/1974 | Pira | 239/542 X |
| 3,898,843 | 8/1975 | Waterston | 61/13 |
| 4,214,701 | 7/1980 | Beckmann | 239/63 |
| 4,221,501 | 9/1980 | Saburi | 405/37 |
| 4,577,997 | 3/1986 | Lehto et al. | 405/43 |
| 4,577,998 | 3/1986 | Dorrn | 405/45 |
| 4,609,014 | 9/1986 | Jurjevic et al. | 138/45 |

OTHER PUBLICATIONS

Entek Corporation, Leaky Pipe Product Brochure, 1986.
Wata-Meta UK Ltd., Wata-Meta Product Brochure, 1987.

Primary Examiner—Randolph A. Reese
Assistant Examiner—Arlen L. Olsen
Attorney, Agent, or Firm—Victor Flores

[57] ABSTRACT

A surface, subsurface continuous feed moisture maintenance system for microscopic volume irrigation utilizing a preset flow rate valve, provided in a single preset flow rate stage or multiple preset flow rate stages, a moisture actuated sensor valve and a plurality of permeating, moisture distribution tubes. The preset flow rate valves are selected and set according to plant moisture needs in the geographical area being irrigated. The moisture actuated sensor valve gradually opens or closes water flow to the system according to soil moisture level conditions and thus prevents over watering and conserves on water resources. The moisture permeating action of the distribution tubes complement the preset flow rate of the valve and the moisture actuated sensor valve to maintain the subsurface at a constant moisture level.

9 Claims, 2 Drawing Sheets

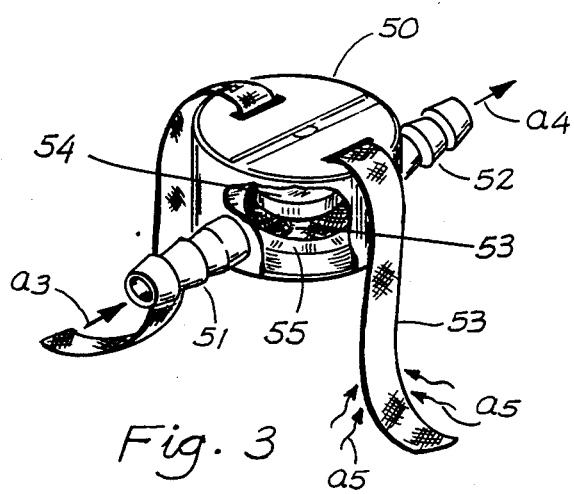
Fig. 3
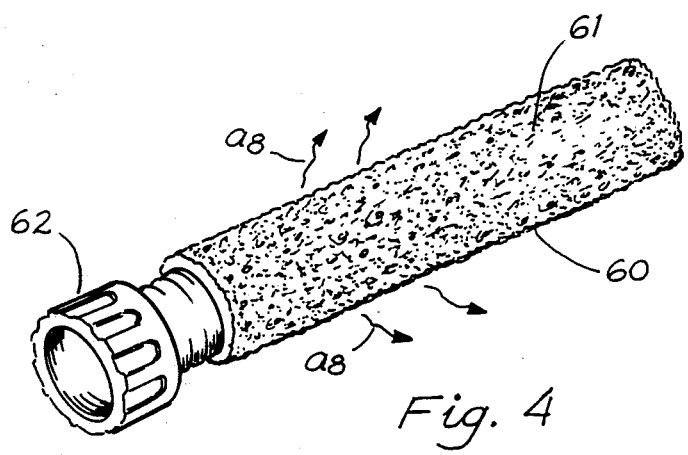
Fig. 4
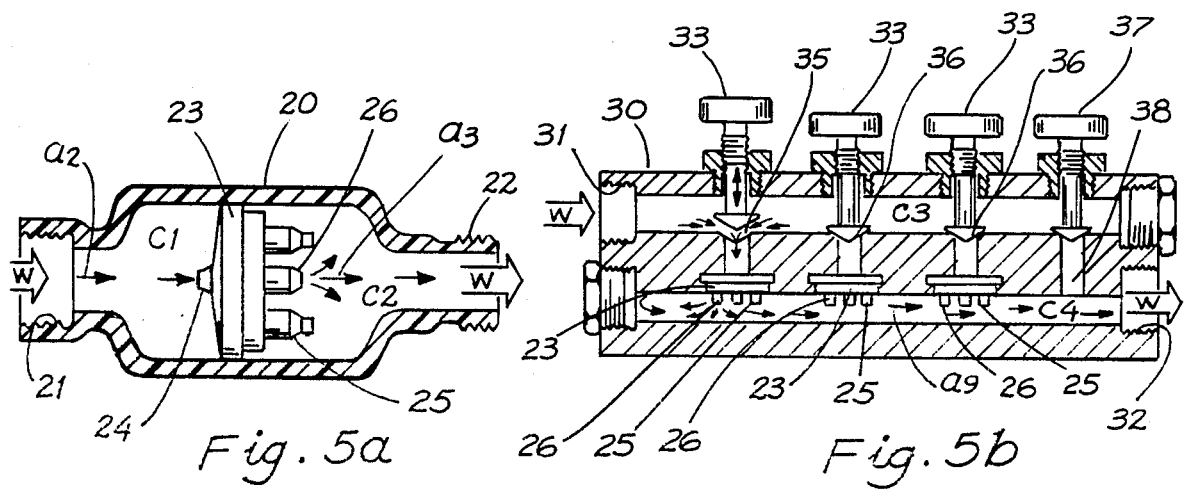
Fig. 5a
Fig. 5b

SURFACE, SUBSURFACE, CONTINUOUS FEED MOISTURE MAINTENANCE SYSTEM APPARATUS AND METHOD

FIELD OF THE INVENTION

This invention relates to watering systems. More particularly, the invention relates to surface or subsurface, continuous feed moisture maintenance systems which employ, in combination, preset flow valves, moisture actuated sensor valves and water permeating distribution tubing. The preset flow valve provides water flow control from a microscopic flow range of approximately ½ gallon per hour up to 50 gallons per hour. The preset flow rate valve is of the type that houses at least one emitter which can be preset to maintain a constant, microscopic flow of water and which can compensate for water pressure variations. The preset flow valve can be provided in single or multiple stages for seasonal applications and which can be flushed to clear debris which may be clogging internal valve passageways. The moisture actuated sensor valve employs a wick and swellable pellets system which act on a diaphragm means that gradually opens and closes the valve according to the amount of moisture absorbed by the pellets. The water permeating distribution tubing are like a saturated membrane that provides a source of moisture for the surrounding soil. In combination, the preset flow valve maintains a preset microscopic flow of water, the moisture actuated sensor valve gradually opens and closes the system depending on soil moisture content and the water permeating distribution tubing provides moisture to the soil in a capillary attraction manner.

DESCRIPTION OF THE PRIOR ART

Various irrigation systems are known which are directed towards maintaining a low volume of water to plants in a given area. The name associated with these low volume watering systems is trickle irrigation. While trickle irrigation systems deliver a low volume of water, the delivery is generally to a small target area, or to a plurality of small target areas. The known trickle irrigation systems do not have a feedback means that is sensitive to the moisture needs of the plant at the root zone or to the surrounding surface moisture level conditions and thus results in wasteful wet and dry cycles. These systems generally employ emitters which provide outlet ports that individually trickle water to a selected target according to a particular flow rate design. The trickle irrigation system, also known as drip irrigation systems, generally wet the surface area of the plant and are not deemed to be an optimum system for plant root zone moisture needs. The subsurface plant root zone moisture needs have been addressed by others by providing water permeable pipe located in the subsurface. The problem seen to exist with irrigation systems employing these water permeable pipe is that of controlling the water flow rate to prevent over saturating the subsurface. Also known to exist are valves which function using a wick and swellable pellets to open and close the valve. While some drip irrigation systems have employed these swellable pellet valves with various emitters for target irrigation, they have been ineffective due to the system's inability to provide moisture to other than a small target. It is not known to take an emitter which is used in trickle irrigation to water other than a small target area, generally a single plant, or several individual plants.

Typical of trickle irrigation systems which are known to be patented include U.S. Pat. No. 3,779,468 to Spencer which teaches a trickle irrigation system including a self-flushing valve and a control valve incorporated in the various tubes of the irrigation system responsive to critical water pressures. U.S. Pat. No. 4,214,701 to Beckmann teaches an irrigation system employing a valve whose water flow is controlled by a swellable member contained in an insert tip. The valve has conduits connected thereto and teach a drip irrigation method. U.S. Pat. No. 3,898,843 to Waterston teaches an irrigation system teaching a variable opening and closing flow control device employing a swellable element disposed outside a fluid supply line and a sleeve member.

Individual devices known for use in irrigation systems, but not in a combination, include emitters such as those manufactured by Rainbird Manufacturing Co., wick valves such as those manufactured by WATAMETA, United Kingdom, LTD, Gloucestershire, England 539 and LEAKY PIPE manufactured by ENTECK Corporation Grapevine Texas. Known patented related devices includes U.S. Pat. No. 3,426,539 to Whear which teaches a moisture actuated device for controlling an underground irrigation system. The device expands to actuate jaw means to pinch and close a resilient tube. U.S. Pat. No. 2,743,552 to Hunter teaches an automatic irrigation device utilizing vacuum pressure sensitive valve structure responsive to water pressure in water filled sealed ceramic cells. U.S. Pat. No. 2,130,498 to Klemschofski et al. teaches a porous pipe structure. U.S. Pat. No. 4,577,997 to Lehto et al. teaches an irrigation pipe formed of two layers where incisions are provided in a longitudinal direction of the pipe. The incisions will open under the action of the water pressure enabling the irrigation water to flow into the surrounding ground.

The prior art does not reach an irrigation system that is truly a moisture maintenance system in the sense that the water flow is tailored to the moisture needs of the plant root zone of plants in a large square area such as lawns, gardens, orchards and the like.

SUMMARY OF THE INVENTION

The present invention thus has a primary object of providing a continuous feed, fully automatic, subsurface moisture maintenance system which will provide to the root zones of all plant life at the same rate of moisture needs. At the heart of the moisture maintenance system is a preset flow valve, a moisture actuated sensor valve and a water permeating tubing. The unique combination of components can result in savings of up to as much as 70% of traditional methods of watering. The moisture maintenance system achieves the primary objective by interconnecting the above mention components in a manner which heretofore has not been done. The preset flow rate valve, which is used for regulating water volume into said maintenance system, according to water needs of plants being watered, is adapted with inlet and outlet ports for connecting to a first length of water distribution tubing from a water source and to an inlet end of a second length of water distribution tubing, respectively, the water source having a main shut-off valve. The moisture actuated sensor valve is adapted having an inlet port for being connected to an outlet end of the second length of water distribution tubing and an outlet port for connecting to an inlet end of a third length of water distribution tubing. The moisture actuated sensor valve is connected to a water distribution manifold adapted with a main inlet port and a plurality of parallel water distribution ports and at least one terminating end. The main inlet port is connected to an outlet end of the third length of water distribution tubing and at the terminating end of the system there is connected a plurality of permeating, moisture distribution tubes, each one having an inlet end connected to a selected water distribution port member of the parallel water distribution ports.

In operation, the permeating tubes are preferably laid in the subsurface areas such as commercial landscaping, residential lawns, gardens and other agricultural uses. The permeating tubes when full of water are like saturated membranes which act as wick, which gradually spreads moisture through the soil by capillary attraction. The preset flow valve provides the primary control on the volume of water that will flow into the system. The moisture actuated sensor valve acts as a fine tuner or regulator. Depending on the moisture content in the soil, the moisture actuated sensor valve will reduce the volume of water allowed into the system or stop the flow completely if the moisture level in the soil becomes too high for the plant life being grown, either from the amount of water that entered the system or as the result of rain or changes in humidity or other factors such as wind or temperature.

Therefore, to the accomplishments of the foregoing objects, the invention consists of the foregoing features hereinafter fully described and particularly pointed out in the claims, the accompanying drawings and following disclosure describing in detail the invention, such drawings and disclosure illustrating, however, but one of the various ways in which the invention may be practiced.

BRIEF DESCRIPTION OF THE DRAWINGS

FIG. 3 is a perspective view of the moisture actuated sensor valve showing the fiber wick members and a cutaway portion showing the internal moisture swellable pellets and diaphragm means.

FIG. 4 is a perspective section view of a moisture permeating tube according to the present invention.

FIG. 5a is a sectioned view of a single stage preset flow valve illustrating an emitter in a housing receiving water at an inlet port and discharging water from a selected outlet port.

FIG. 5b is a sectioned view of a seasonal valve illustrating having multiple stages of preset emitters within a housing and being controlled by associated valve open/close stems, also illustrated is a flushing port with associated open/close stem.

DESCRIPTION OF THE PREFERRED EMBODIMENTS

Figure 1:
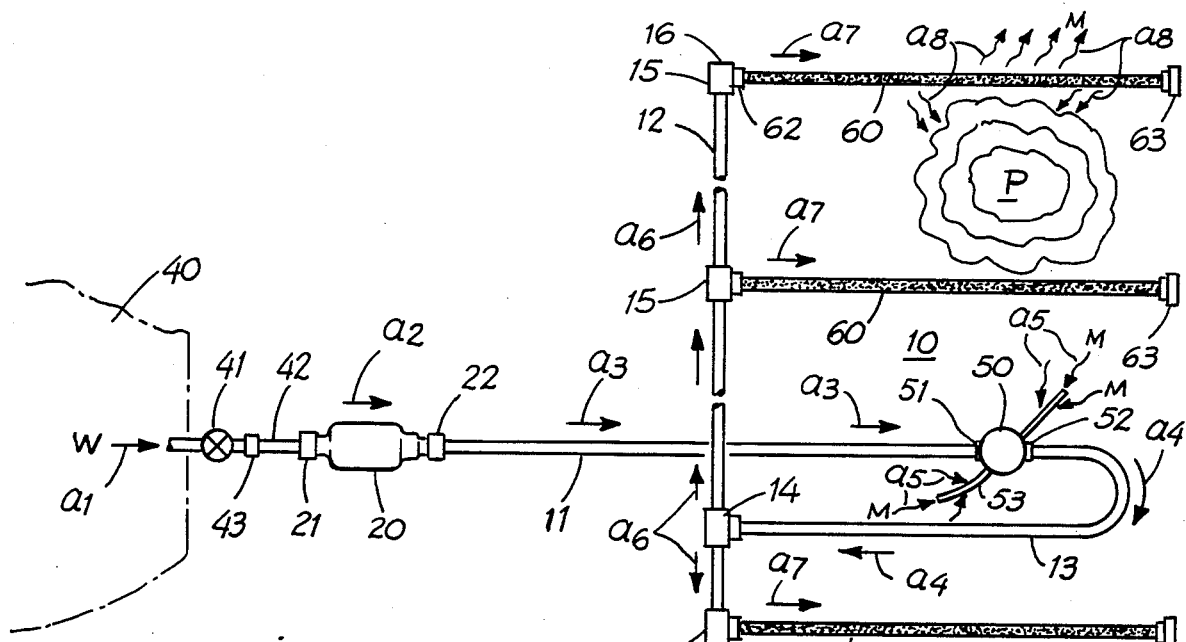
FIG. 1 is a schematic view diagrammatically illustrating a moisture maintenance system including a single stage preset flow valve, a moisture actuated sensor valve and a plurality of moisture permeating tubing which comprises one embodiment of the present invention.
Figure 2:
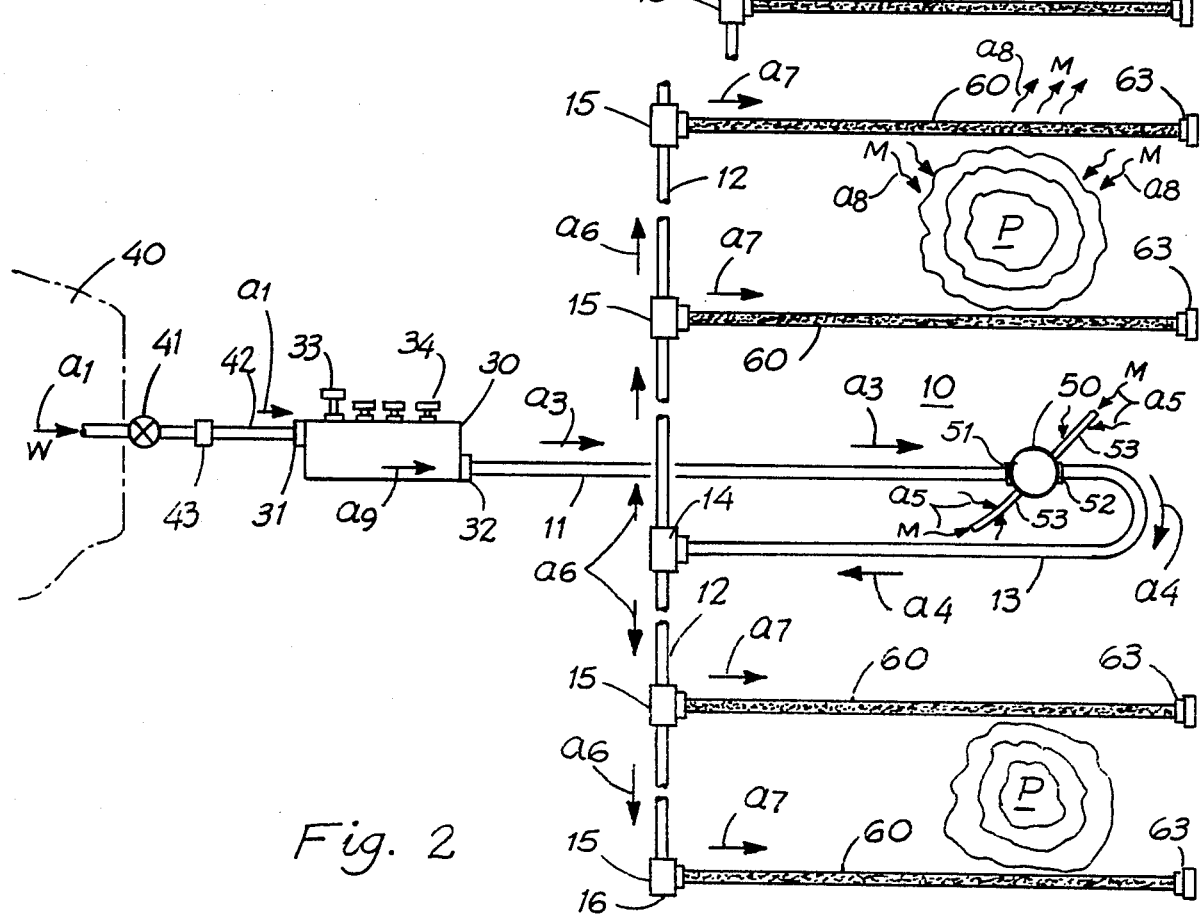
FIG. 2 is a schematic view diagrammatically illustrating another embodiment of the present invention comprising a manually selected seasonal valve provided with multiple stage preset flow valve settings.

Referring now to FIG. 1 where is shown a single valve stage embodiment of a moisture maintenance system 10 being fed from a water source 40 and adapted with a single stage valve 20 coupled to a moisture actuated sensor valve 50, a distribution manifold 12 and a plurality of moisture permeating tubing 60 used in distributing moisture to a plant P. Similarly, FIG. 2 shows a another embodiment of a moisture maintenance system 10 featuring a multiple stage valve 30 which can be manually adjusted using open/close stem 33 to provide a variety of water flow rates for seasonal applications. Valve 30 is also provided with a flushing means actuated by open/close stem 34.

In the embodiments of both FIG. 1 and FIG. 2, water source 40 feeds the system 10 via a mainline shut-off valve 41, an inline filter means 43, and a first length of water distribution tubing 42. In the single valve stage embodiment of FIG. 1, valve 20 has an inlet port 21 connected to an outlet end of the first length of water distribution tubing 42 and an outlet port 22 connected to an inlet end of a second length of water distribution tubing 11. Similarly, in the multiple stage valve embodiment of FIG. 2, valve 30 has an inlet port 31 connected to an outlet end of first length of water distribution 42 and an outlet port 32 connected to an inlet end of second length of water distribution tubing 11.

For either embodiment shown in FIGS. 1 and 2, relating to the single stage valve 20 or the multiple stage valve 30, a moisture actuated sensor valve 50 has an inlet port 51 connected to an outlet end of said second length of water distribution tubing 11 and an outlet port 52 for connecting to an inlet end of a third length of water distribution tubing 13. The outlet end of third length of water distribution tubing 13 connects to a main inlet port 14 of a water distribution manifold 12. Water distribution manifold 12 has a plurality of parallel water distribution ports 15 and at least one terminating end 16. The terminating end of moisture maintenance system 10 comprises a plurality of permeating, moisture distribution tubes 60, generally positioned in a subsurface manner for providing moisture M to plants P. Each one of said plurality of permeating, moisture distribution tubes 60 having an inlet end 62 connected to a selected water distribution port 15 and a closed terminating end 63.

In operation, the moisture maintenance system 10, shown in either FIGS. 1 or 2 draws water W from water source 40 in the direction of arrow a1, through valve 41, through filter 43 through valve 20 in the direction of arrow a2 (if using a single stage valve) or through valve 30 in the direction of arrow a9 (if using a multiple stage valve). Water then continues in the direction a3 to flow into sensor valve 50. Sensor valve is responsive to moisture M attracted in the direction of arrows a5 toward wicks 53. The water will flow through sensor valve 50, in the direction of arrow a4, in volumes according to the amount of force exerted by the swellable pellets 54 on diaphragm means 55, see FIG. 3. The water is then distributed from manifold 14 in directions of arrows a6 and a7 toward water permeating tubing 60. It should be noted that the moisture actuated sensor valve 50 could be repeated where deemed necessary to control water flow to any of the connected tubes 60. The water within tubes 60 saturates the entire length which then activates a natural capillary attraction of moisture M in the soil towards plant P or throughout the immediate area where tubes 60 are buried, as shown by arrows a8.

FIG. 3 shows the moisture actuated sensor valve 50 which regulates the actual volume of water being distributed through the system. The water flows into inlet port 51 and out of outlet port 52 as shown by arrow a3 and a4, respectively, through an internal passageway covered by diaphragm 55. Diaphragm 55 is acted upon by moisture swellable pellets 54, which are hydraulically coupled to wick fibers 53.

FIG. 4 shows a section of water permeating tubing 60 adapted with inlet end 62 and a flexible, porous, water saturable material 61.

FIGS. 5a and 5b show a section view of the present valves used in system 10 as single stage valve 20 and a multiple stage valve 30, respectively. Single stage valve 20 is shown having inlet port 21, outlet port 22, an emitter 23 positioned between an inlet chamber C1 and outlet chamber C2. The chamber C1 receives water W into for being directed into emitter inlet port 24. Emitter 23 is generally provided with plugged ports 25 which are subsequently unplugged in the form of ports 26 when presetting the valve to a specific flow rate setting for collective water distribution of water volume out outlet end 22. The multiple stage valve 30 is provided with a plurality of emitters 23 positioned between inlet chamber C3 and outlet chamber C4. Each emitter 23 has an inlet portion adjustably controlled by use of stem 33 to expose an opening 35 or to provide a sealed interface 36. The adjustability provided by use of stems 33 allows water W entering inlet port 33 to flow in a variety of volumes out of outlet port 32 depending on a seasonal need of the application. The seasonal valve is provided with a flushing port 38 controlled by stem 37 for selective full water source flushing of the system.

Therefore, while the present invention has been shown and described herein in what is believed to be the most practical and preferred embodiment, it is recognized that departures can be made therefrom within the scope of the invention, which is therefore not to be limited to the details disclosed herein but is to be accorded the full scope of the claims so as to embrace any and all equivalent apparatus.

I claim:

1. A moisture maintenance system for microscopic irrigation, said moisture maintenance system comprising:
    (a) a preset flow rate valve means for regulating water volume into said maintenance system according to water needs of plants being watered, said valve means being adapted with inlet and outlet ports for connecting to a first length of water distribution tubing from a water source and to an inlet end of a second length of water distribution tubing, respectively, said water source having a main shut-off valve, said preset flow rate valve means comprising:
        at least one emitter means for maintaining a continuous microscopic flow of water at a specified constant rate, within a specified range of inlet water pressures, and
        a housing means for encapsulating said at least one emitter means and for containing said provided water flow from said emitter means to be distributed to said moisture maintenance system,
            said at least one emitter means being a housed emitter means within said housing means,
            said at least one housed emitter means includes an inlet port and a plurality of outlet ports, each outlet port being designed to provide a preset flow rate, said plurality of outlet ports being provided having a closed orifice and being selectively opened to provide a preset water volume determined by the number of opened outlet ports;
    (b) a moisture actuated sensor valve, said moisture actuated sensor valve having an inlet port for being connected to an outlet end of said second length of water distribution tubing and an outlet port for connecting to an inlet end of a third length of water distribution tubing;
    (c) a water distribution manifold, said manifold having a main inlet port and a plurality of parallel water distribution ports and at least one terminating end, said main inlet port being connected to an outlet end of said third length of water distribution tubing; and
    (d) a plurality of permeating, moisture distribution tubes, each one of said plurality of moisture distribution tubes having an inlet end connected to a selected water distribution port member of said plurality of parallel water distribution ports and a closed terminating end.

2. A moisture maintenance system for microscopic irrigation as recited in claim 1, wherein:
    (a) said housing means is comprised of a first housing member and a second housing member, said first housing member forming an inlet chamber and said second housing member forming an outlet chamber, said housed emitter means being fixedly positioned and sealed between said inlet and outlet chambers, said inlet chamber being designed for containing water at substantially high pressures and providing an inlet water source to said inlet port of said housed emitter means, said plurality of outlet ports which are selectively opened, being designed for discharging said preset water volume into said outlet chamber;
    (b) said first housing member includes at least one valve inlet port adapted for connecting to said first length of water distribution tubing from said water source; and
    (c) said second housing member includes at least one valve outlet port adapted for connecting to said second length of water distribution tubing.

3. A moisture maintenance system for microscopic irrigation as recited in claim 1, wherein said moisture actuated sensor valve further comprises:
    (a) a plurality of fiber wicks means for sensing soil moisture level and transmitting and receiving moisture through capillary action to and from said moisture actuated sensor valve,
    (b) a plurality of moisture sensitive pellet means located within said moisture actuated sensor valve for receiving said transmitted moisture from said plurality of fiber wick means and acting in a swellable manner on a diaphragm means within said moisture actuated sensor valve to gradually close said moisture actuated sensor valve and to gradually open when said moisture sensitive pellets shrink in size due to reverse flow of moisture to said fiber wick means.

4. A moisture maintenance system for microscopic irrigation as recited in claim 3, wherein said moisture actuated sensor valve being a WATA-META-VALVE.

5. A moisture maintenance system for microscopic irrigation as recited in claim 1, wherein each one of said plurality of permeating, moisture distribution tubes, further comprises: a flexible, porous pipe, said pipe being constructed of a water saturable material for being buried underground and permeating moisture to surrounding soil.

6. A moisture maintenance system for microscopic irrigation as recited in claim 5, wherein each one of said plurality of permeating, moisture distribution tubes being a length of LEAKY PIPE.

7. A method of maintaining a constant moisture level in a plant root zone, said method comprising the steps of:
(a) determining the moisture needs of the plants on a seasonal basis;
(b) providing and presetting a preset flow rate valve according to said determining step, said preset flow rate valve comprising:
at least one emitter means for maintaining a continuous microscopic flow of water at a specified constant rate, within a specified range of inlet water pressures, and
a housing means for encapsulating said at least one emitter means and for containing said provided water flow from said emitter means to be distributed to said moisture maintenance system,
said at least one emitter means being a housed emitter means within said housing means,
said at least one housed emitter means includes an inlet port and a plurality of outlet ports, each outlet port being designed to provide a preset flow rate, said plurality of outlet ports being provided having a closed orifice and being selectively opened to provide a preset water volume determined by the number of opened outlet ports;
(c) incorporating said provided preset flow rate valve into a subsurface, continuous feed, moisture maintenance system and providing said moisture maintenance system for maintaining said constant moisture level, said moisture maintenance system comprising,
(i) said provided preset flow rate valve, said preset flow valve being adapted with inlet and outlet ports for connecting to a first length of water distribution tubing from a water source and to an inlet end of a second length of water distribution tubing, respectively, said water source having a main shut-off valve,
(ii) a moisture actuated sensor valve, said moisture actuated sensor valve having an inlet port for being connected to an outlet end of said second length of water distribution tubing and an outlet port for connecting to an inlet end of a third length of water distribution tubing,
(iii) a water distribution manifold, said manifold having a main inlet port and a plurality of parallel water distribution ports and at least one terminating end, said main inlet port being connected to an outlet end of said third length of water distribution tubing, and
(iv) a plurality of permeating, moisture distribution tubes, each one of said plurality of moisture distribution tubes having an inlet end connected to a selected water distribution port member of said plurality of parallel water distribution ports and a closed terminating end;
(d) installing said moisture maintenance system in a subsurface plant root zone; and
(e) activating said installed moisture maintenance system and thereby maintaining said constant moisture in said plant root zone.

8. A method of maintaining a constant moisture in a plant root zone as recited in claim 7, wherein said moisture actuated sensor valve comprises,
(a) a plurality of fiber wicks means for sensing soil moisture level and transmitting and receiving moisture through capillary action to and from said moisture actuated sensor valve,
(b) a plurality of moisture sensitive pellet means located within said moisture actuated sensor valve for receiving said transmitted moisture from said plurality of fiber wick means and acting in a swellable manner on a diaphragm means within said moisture actuated sensor valve to gradually close said moisture actuated sensor valve and to gradually open when said moisture sensitive pellets shrink in size due to reverse flow of moisture to said fiber wick means.

9. A method of maintaining a constant moisture in a plant root zone as recited in claim 7, wherein each one of said plurality of permeating, moisture distribution tubes, further comprises a flexible, porous pipe, said pipe being constructed of a water saturable material for being buried underground and permeating moisture to surrounding soil.

* * * * *